(12) United States Patent
Ueda et al.

(10) Patent No.: US 7,175,511 B2
(45) Date of Patent: Feb. 13, 2007

(54) METHOD OF MANUFACTURING SUBSTRATE FOR MAGNETIC DISK, APPARATUS FOR MANUFACTURING SUBSTRATE FOR MAGNETIC DISK, AND METHOD OF MANUFACTURING MAGNETIC DISK

(75) Inventors: Masaaki Ueda, Tokyo (JP); Ryuichi Kashima, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 10/542,803

(22) PCT Filed: Jul. 9, 2004

(86) PCT No.: PCT/JP2004/009806

§ 371 (c)(1),
(2), (4) Date: Mar. 6, 2006

(87) PCT Pub. No.: WO2005/005099

PCT Pub. Date: Jan. 20, 2005

(65) Prior Publication Data

US 2006/0148386 A1 Jul. 6, 2006

(30) Foreign Application Priority Data

Jul. 15, 2003 (JP) ............................. 2003-274900

(51) Int. Cl.
*B24B 1/00* (2006.01)
(52) U.S. Cl. ........................... 451/63; 451/11; 451/41; 451/285

(58) Field of Classification Search ................ 451/11, 451/41, 21, 37, 42, 53–55, 60, 63, 259, 285–290, 451/283, 364, 384, 397, 402; 252/62.52; 51/307–309
See application file for complete search history.

(56) References Cited

U.S. PATENT DOCUMENTS 5,036,015 A * 7/1991 Sandhu et al. ................ 438/14

(Continued)

FOREIGN PATENT DOCUMENTS

JP 60-242963 A 12/1985

(Continued)

*Primary Examiner*—Lee D. Wilson
*Assistant Examiner*—Anthony Ojini
(74) *Attorney, Agent, or Firm*—Sughrue Mion, PLLC

(57) ABSTRACT

A magnetic polishing method capable of easily and satisfactorily polishing the inner peripheral end face of a circular hole (1) at the center part of a disk substrate (2) even if the diameter of the circular hole is reduced. By this method, a large quantity of disk substrates with stable quality can be supplied, thermal asperity trouble and head crush can be prevented from occurring on a magnetic disk, and the density of the information recording surface of the magnetic disk can be increased. In the method for polishing the inner peripheral end face of the circular hole (1) at the center part of the disk substrate (2), a magnetic field is formed on the inner peripheral side of the circular hole (1), abrasive materials (4) including magnetic particles and abrasive grains are held by the magnetic field in the circular hole, and the magnetic field is moved to the inner peripheral end face of the circular hole (1) to move the abrasive materials (4) to the inner peripheral end face of the circular hole (1) for polishing the inner peripheral end face of the circular hole (1).

14 Claims, 8 Drawing Sheets

U.S. PATENT DOCUMENTS

| | | | |
|---|---|---|---|
| 5,069,002 A | * 12/1991 | Sandhu et al. | 451/1 |
| 5,081,796 A | * 1/1992 | Schultz | 451/8 |
| 6,059,638 A | * 5/2000 | Crevasse et al. | 451/41 |
| 6,354,928 B1 | * 3/2002 | Crevasse et al. | 451/397 |

FOREIGN PATENT DOCUMENTS

| | | |
|---|---|---|
| JP | 6091520 A | 4/1994 |
| JP | 7-230621 A | 8/1995 |
| JP | 7251369 A | 10/1995 |
| JP | 8001506 A | 1/1996 |
| JP | 8-132343 A | 5/1996 |
| JP | 2000-61810 A | 2/2000 |
| JP | 2000-185927 A | 7/2000 |
| JP | 2002150546 A | 5/2002 |
| JP | 2002-265933 A | 9/2002 |
| JP | 2002342915 A | 11/2002 |
| JP | 200322522 A | 1/2003 |

* cited by examiner

[Fig. 1]
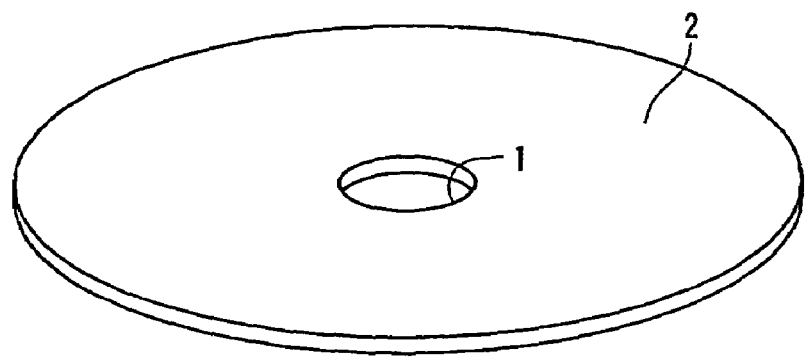
[Fig. 2]
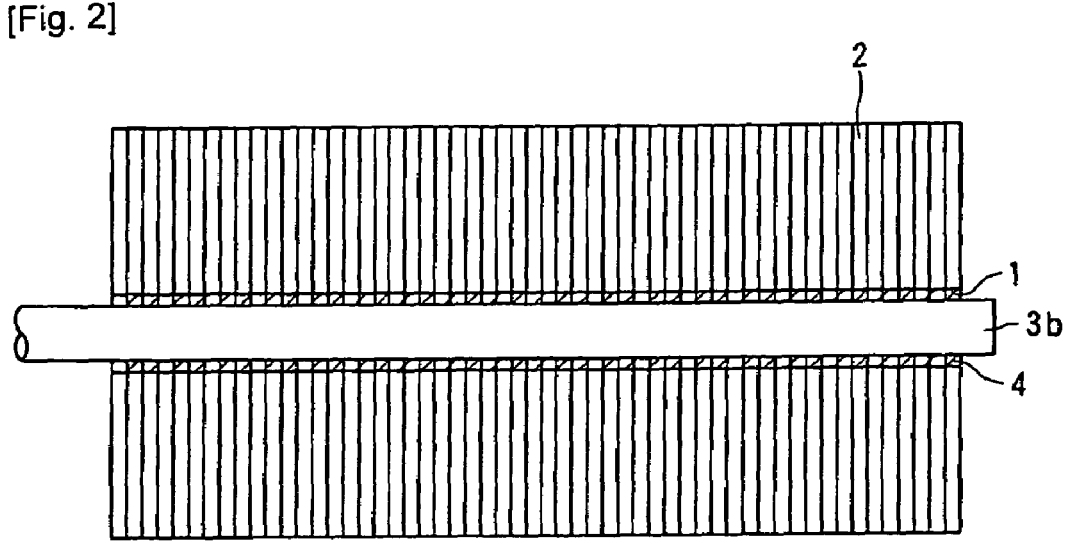

[Fig. 3]
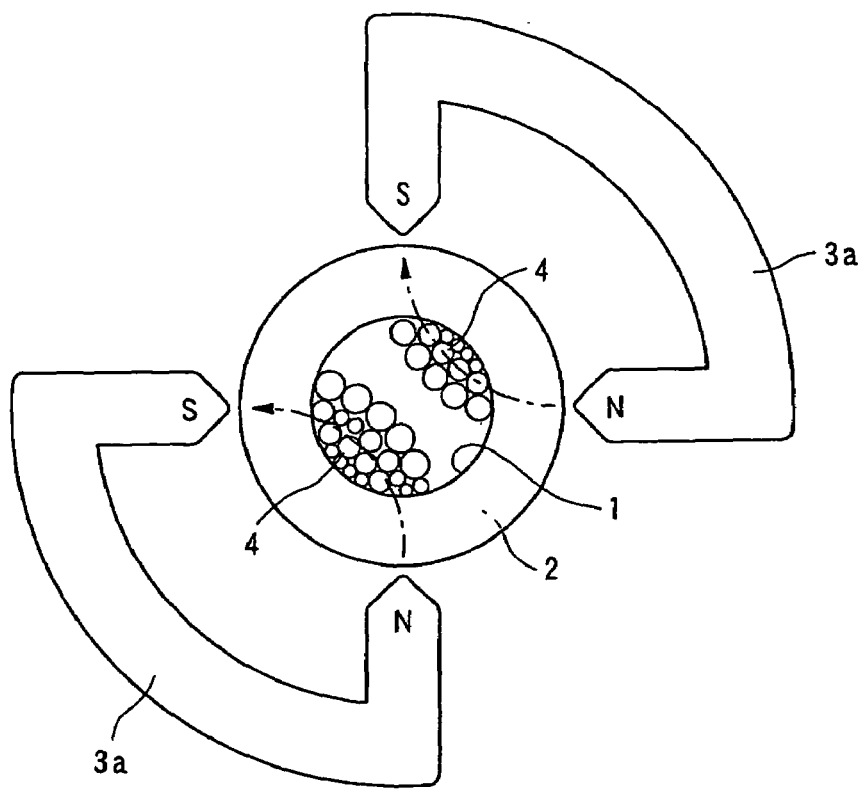
[Fig. 4]
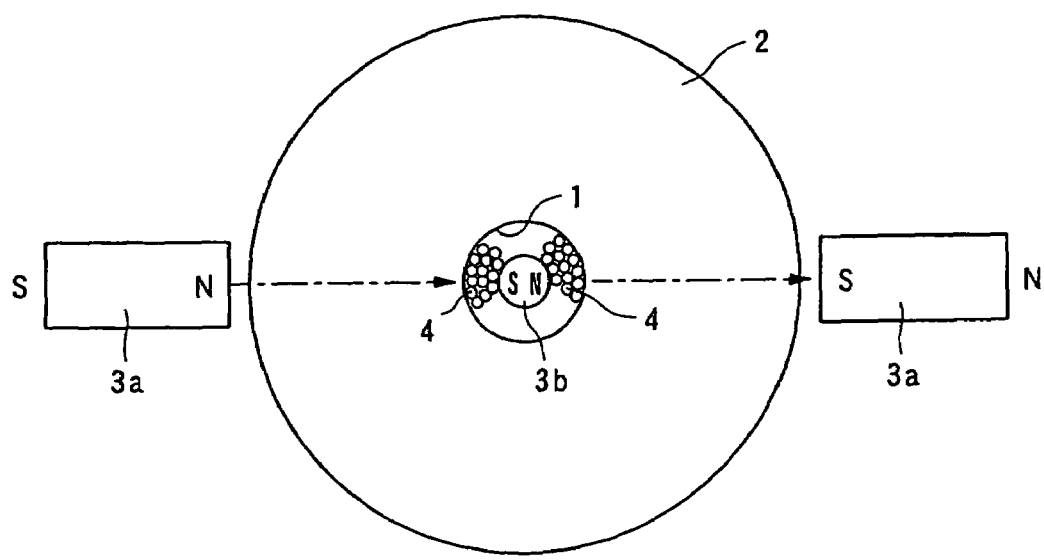

[Fig. 5]
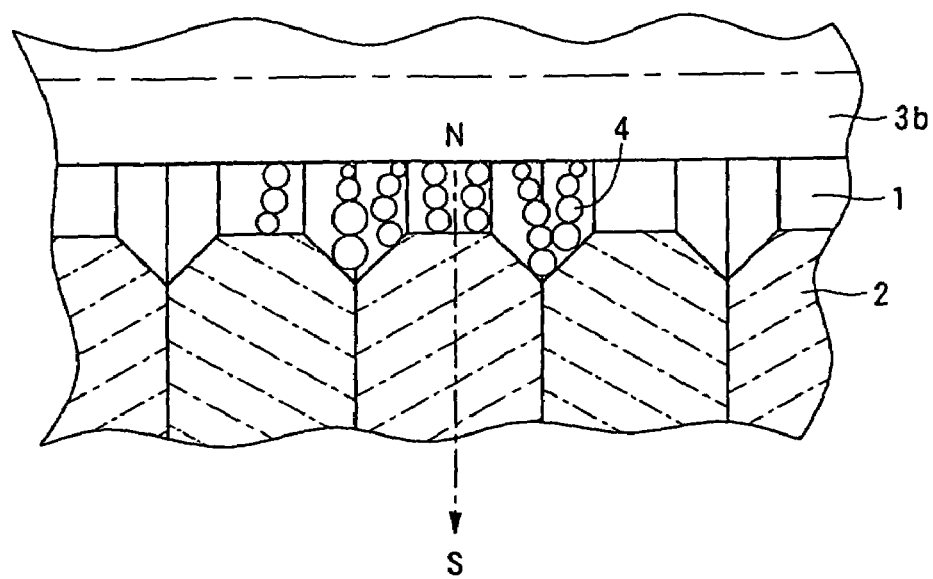
[Fig. 6]
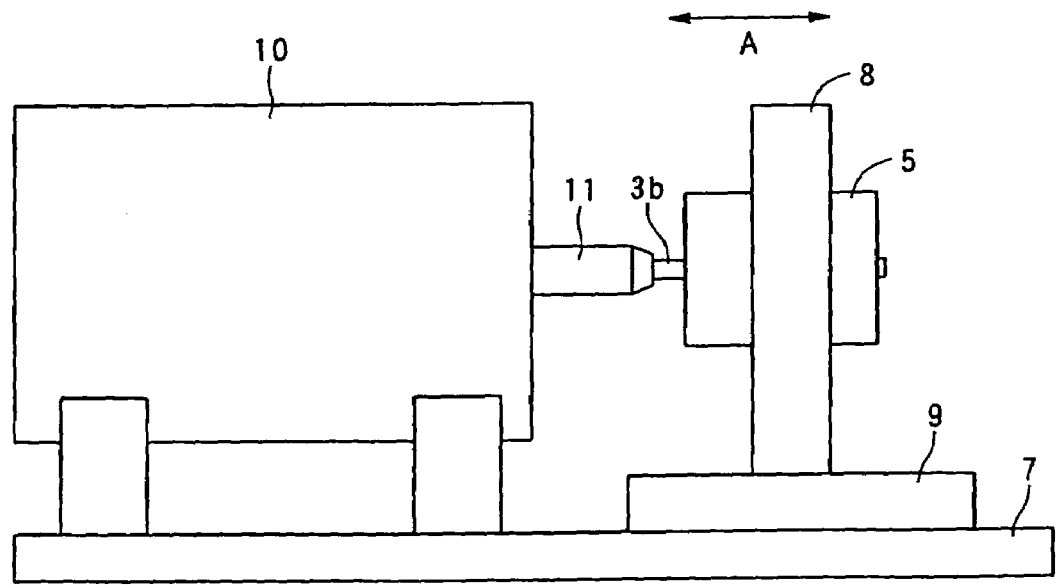

[Fig. 7]
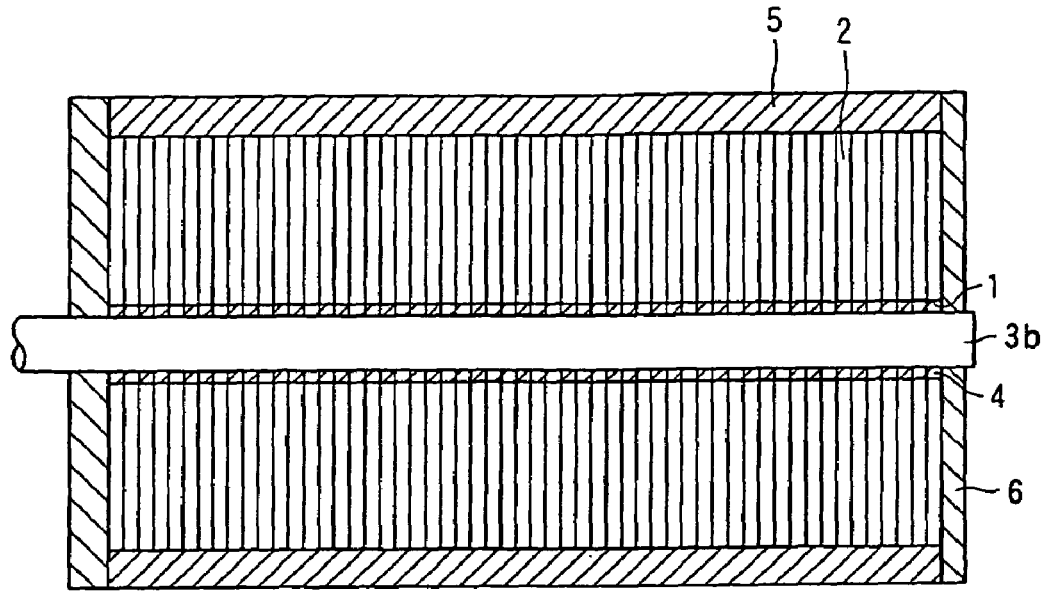
[Fig. 8]
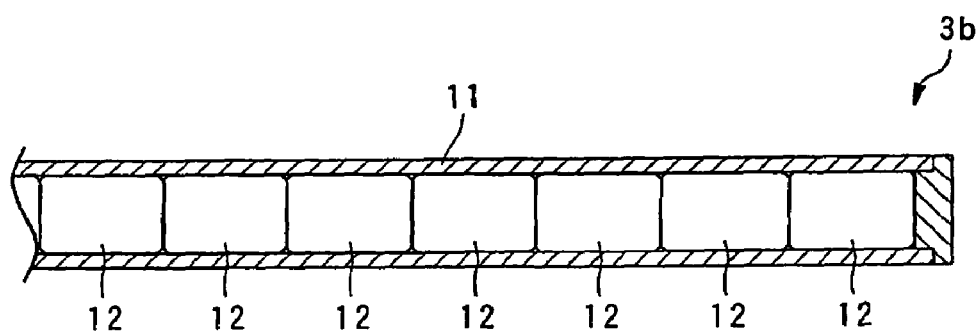

[Fig. 9]
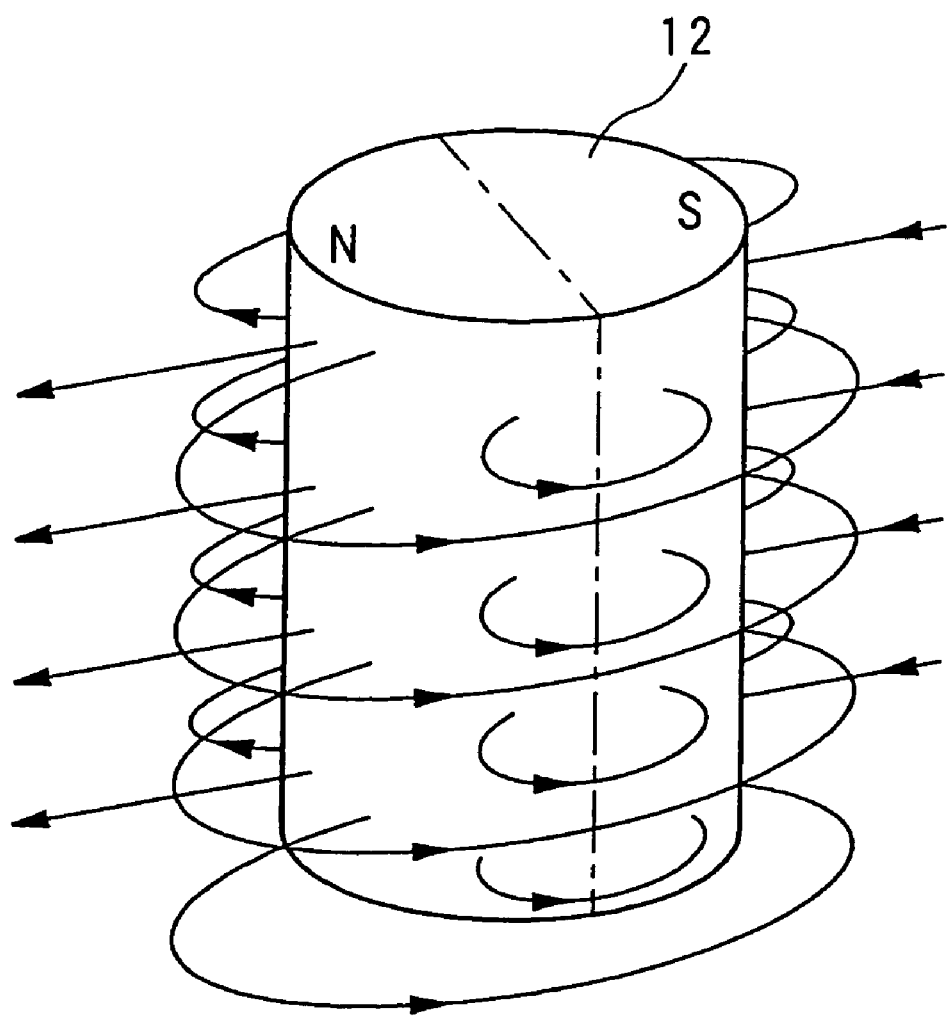

[Fig. 10]
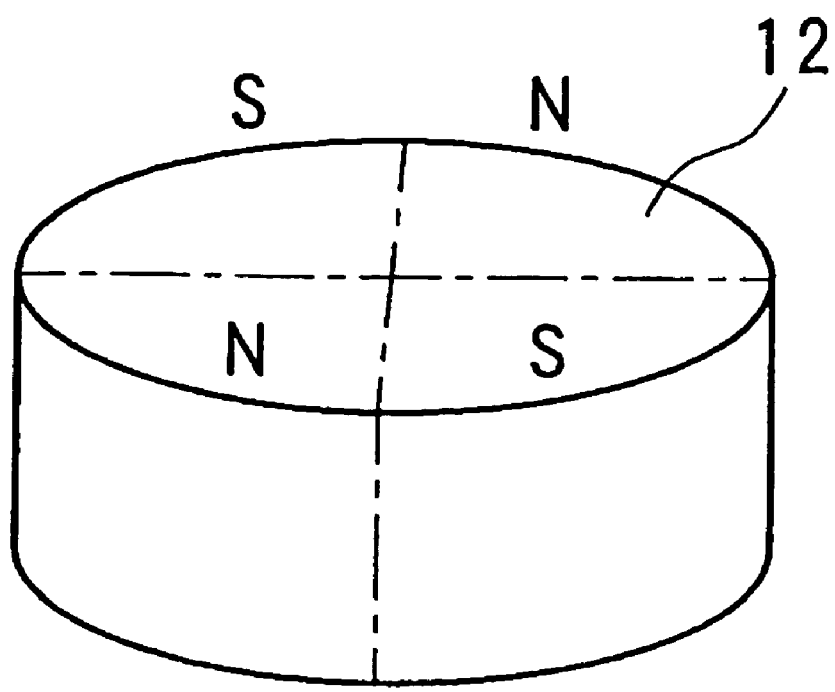

[Fig. 11]
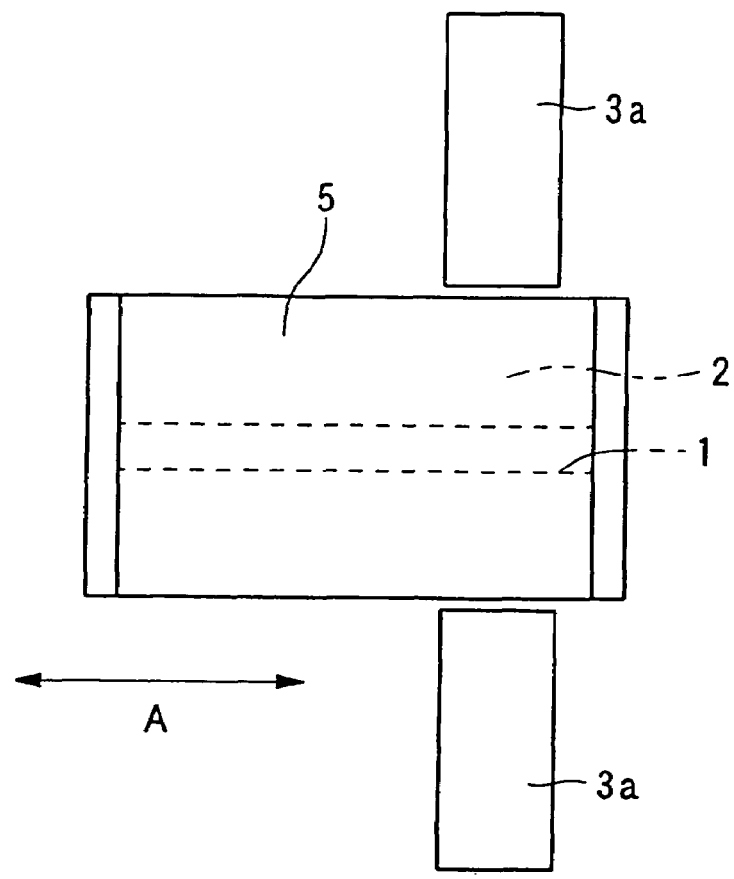
[Fig. 12]
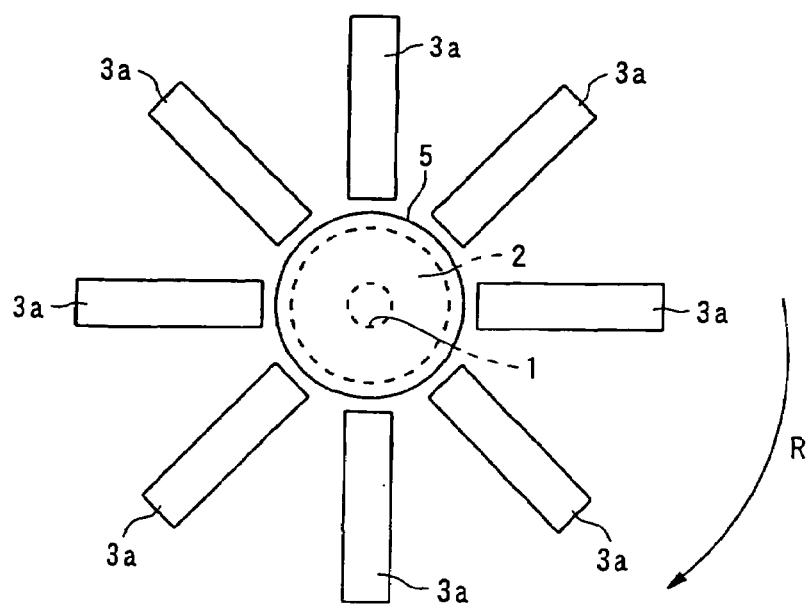

[Fig. 13]
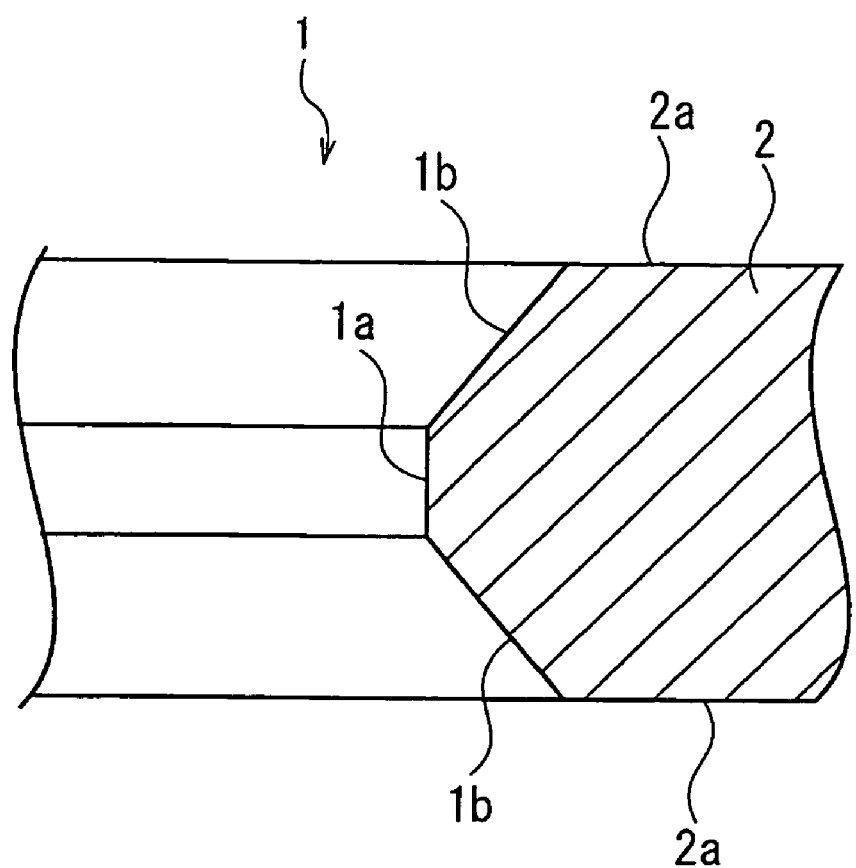

METHOD OF MANUFACTURING SUBSTRATE FOR MAGNETIC DISK, APPARATUS FOR MANUFACTURING SUBSTRATE FOR MAGNETIC DISK, AND METHOD OF MANUFACTURING MAGNETIC DISK this application is a 371 of PCT/JP 04/09806 Jul. 9, 2004

TECHNICAL FIELD

This invention relates to a method and apparatus for manufacturing a substrate for a magnetic disk for use in a magnetic disk that serves as a recording medium in an information recording device such as a hard disk drive (HDD) and, in particular, relates to a method and apparatus for manufacturing a substrate for a magnetic disk which can suitably polish an inner peripheral end face and an outer peripheral end face of a substrate for a magnetic disk, or the like.

BACKGROUND ART

In recent years, various information processing devices have been proposed following the advancement of information society and further, information recording devices such as hard disk drives (HDDs) for use in those information processing devices has been proposed. In such information recording devices, larger information recording capacities and higher information recording densities have been required for the purpose of miniaturization and higher performances of the information processing devices.

In a hard disk drive (HDD), in order to increase the information recording density, it is necessary to reduce a so-called spacing loss so that it is required to reduce a flying height (glide height) of a magnetic head that performs recording/reproduction with respect to a magnetic disk serving as a recording medium.

Since the magnetic disk is rotated at high speed during recording/reproduction, if the flying height of the magnetic head is reduced, there arises a greater possibility that the magnetic head contacts the surface of the magnetic disk so as to be crashed. In order to prevent such a crash of the magnetic head, it is necessary to finish the surface of the magnetic disk as an extremely smooth surface.

In order to realize such smoothness of the surface of the magnetic disk, a glass substrate has been used as a disk substrate in place of an aluminum substrate which has conventionally been widely used. This is because the glass substrate is excellent in surface flatness and substrate strength as compared with the aluminum substrate. As such a glass substrate, use is made of, in order to increase the substrate strength, a chemically strengthened glass substrate or a crystallized glass substrate increased in substrate strength by crystallization.

However, even if the smoothness of the surface of the disk substrate is ensured, it is further necessary to keep the surface of the disk substrate as a highly cleaned surface with no foreign matter. This is because if foreign matter is adhering to the surface of the disk substrate, it becomes a cause for a film defect of a magnetic thin film to be formed on the surface of the glass substrate or it becomes a cause for occurrence of a convex portion on the surface of the magnetic thin film so that a proper flying height of the magnetic head cannot be obtained.

On the other hand, as a magnetic head, use has been widely made of, in order to improve a signal strength upon record reproduction, a magnetoresistive head (MR head) or a giant magnetoresistive head (GMR head) using a magnetoresistive effect element (MR element), in place of a thin film head which has conventionally been widely used.

In such a magnetoresistive head using the magnetoresistive effect element, when a small roughness is formed on the surface of a magnetic disk, a thermal asperity trouble may occur to cause malfunction in reproduction or the reproduction may be impossible. This thermal asperity trouble is caused such that a convex portion formed on the surface of a magnetic disk due to foreign matter on a glass substrate generates adiabatic compression and adiabatic expansion of air in the vicinity of a magnetoresistive head due to high-speed rotation of the magnetic disk so that the magnetoresistive head generates heat to cause a change in resistance value of a magnetoresistive effect element and, therefore, electromagnetic conversion is adversely affected. That is, such a thermal asperity trouble can be generated even in the case where the magnetic head does not contact the magnetic disk.

Therefore, in order to also prevent the thermal asperity trouble, it is necessary to finish the surface of the magnetic disk as a surface that is extremely smooth and highly cleaned with no foreign matter.

As a cause for adhesion of foreign matter to the surface of the glass substrate, not only the surface shape of the magnetic disk but also the surface shape of an end face of the disk substrate are considered. Specifically, when the surface shape of the end face of the disk substrate is not smooth, this end face abrades a wall surface of a resin case so that dust (particles) of resin or glass is generated due to the abrasion. Then, such dust and dust in an atmosphere are captured and accumulated on the end face of the disk substrate. It is presumed that the dust accumulated on the end face of the disk substrate becomes a dust generation source and causes the adhesion of the foreign matter to the surface of the disk substrate in a later process or after mounted in a hard disk drive. Particularly, it is considered that the end face on the inner peripheral side of the glass substrate has a rougher surface shape as compared with the end face on the outer peripheral side and therefore is liable to capture the dust to thereby prevent the high cleaning of the surface of the glass substrate.

For the purpose of suppressing such a defect caused by the surface shape of the end face of the disk substrate, the present applicant has previously proposed a method of polishing an end face of a disk-shaped disk substrate by contacting a rotating polishing brush or polishing pad with the end face of the disk substrate, as described in Patent Document 1.

On the other hand, as described in Patent Document 2, proposal has been made of a technique of achieving improvement in substrate strength by removing, through chemical etching, a crack generated on an end face of a disk substrate made of glass. In this technique, although it is possible to prevent degradation of a strength of the glass substrate caused by the crack, the crack is broadened to form a hollow so that dust is easily captured instead and, therefore, the high cleaning of the surface of the disk substrate cannot be achieved.

Patent Document 1: JP 2000-185927 A

Patent Document 2: JP 7-230621 A

DISCLOSURE OF THE INVENTION

Problem to be Solved by the Invention

On the other hand, in recent years, in magnetic disks of hard disk drives (HDDs), it has been becoming possible to realize an information recording surface density of 40 gigabits per inch$^2$ (40 Gbit/inch$^2$) or more.

Since it is possible to realize such a high information recording surface density, it has become possible to achieve miniaturization of the hard disk drives (HDDs) per information recording capacity. Therefore, the range of use of the hard disk drives (HDDs) not only includes the conventional use of mounting into computer devices (personal computers or servers) but also is expanding to uses of mounting into vehicle equipment and portable equipment such as car navigation systems, PDAs (Personal Digital Assistances: portable information terminals), and portable telephones.

In the use of mounting into the vehicle equipment or portable equipment, because of being carried or used in on-vehicle environment as different from the conventional use, cases of the hard disk drives (HDDs) are reduced in size and weight and the sizes (outer diameters) of magnetic disks are also reduced in diameter.

When the size of the magnetic disk is reduced in diameter, it is also necessary to reduce the inner diameter of a circular hole at a center portion of a disk substrate. While the outer diameter of the magnetic disk is set depending on a reduction ratio of the case of the hard disk drive (HDD), a reduction ratio of the inner diameter of the circular hole at the center portion is often required to be more reduced than the reduction ratio of the outer diameter. This is because, by reducing the inner diameter of the circular hole at the center portion as much as possible, a reduction in area of a recording/reproduction region, which is caused following the reduction in diameter of the magnetic disk, is relaxed even in some degree to ensure the area of the recording/reproduction region, thereby minimizing the decrease in information recording capacity caused by the reduction in diameter of the magnetic disk.

In order to polish an end face on the inner peripheral side of the disk substrate, in which the inner diameter of the circular hole at the center portion is thus reduced, by the use of a polishing brush or a polishing pad, the polishing brush or the polishing pad is required be miniaturized and more precise.

Naturally, with respect to an end face on the outer peripheral side, a polishing brush or a polishing pad should also be miniaturized and more precise.

However, if the polishing pad or the polishing brush is miniaturized and more precise, it becomes difficult to ensure a predetermined rigidity required for the polishing pad or the polishing brush upon polishing and thus it becomes difficult to satisfactorily carry out the polishing or it becomes difficult to manufacture the polishing pad or the polishing brush. Consequently, the manufacturing cost of the magnetic disk may be increased.

Particularly, with respect to the uses of the miniaturized hard disk drives (HDDs), a demand is strong for reduction in cost and mass production and, therefore, it is necessary to supply disk substrates and magnetic disks at low prices and in large quantities. However, if the polishing of the end faces of the disk substrates is difficult, it becomes difficult to guarantee the quality of the end faces with respect to the large number of disk substrates and therefore it becomes difficult to stably supply the large number of magnetic disks.

Therefore, this invention is proposed under the foregoing circumstances and a first object thereof is to provide a method of manufacturing a substrate for a magnetic disk which, even if a circular hole at a center portion of a nonmagnetic disk substrate is reduced in diameter, can simply and easily polish at least an end face on the inner peripheral side of the circular hole into a mirror surface, thereby enabling providing stable-quality disk substrates and magnetic disks at low prices and in large quantities.

Further, a second object of this invention is to provide a method of manufacturing a substrate for a magnetic disk which, even if a circular hole at a center portion of a nonmagnetic disk substrate is reduced in diameter, can satisfactorily polish at least an end face on the inner peripheral side of the circular hole into a mirror surface, thereby preventing a thermal asperity trouble and head crash with respect to a magnetic disk using such a substrate for the magnetic disk and thus serving to increase the information recording surface density in the magnetic disk.

Means for Solving the Problem

As a result of making researches for solving the foregoing problems, the present inventors have found that the foregoing problems can be solved by introducing magnetic abrasive finishing with respect to a process of polishing an end face on the inner peripheral side of a circular hole at a center portion of a nonmagnetic disk substrate in the manufacturing process of a substrate for a magnetic disk.

In this invention, the magnetic abrasive finishing is such that a magnetic field is formed at least on the inner peripheral side of a circular hole at a center portion of a nonmagnetic disk substrate, an abrasive material containing magnetic particles and abrasive particles is held in the circular hole by a magnetic field and, by moving the magnetic field with respect to an end face on the inner peripheral side of the circular hole, the abrasive material is moved with respect to the end face on the inner peripheral side of the circular hole to thereby polish the end face on the inner peripheral side of the circular hole. By performing the polishing according to such magnetic abrasive finishing, even if the circular hole is reduced in diameter, the end face on the inner peripheral side of the circular hole can be satisfactorily polished. With respect to moving the magnetic field with respect to the end face on the inner peripheral side of the circular hole as described above, some specific examples will be described in the later-described best mode for carrying out the invention. As one example of them, there is shown the case in which, in the state where a magnet bar is inserted (retained) in the circular hole at the center portion of the nonmagnetic disk substrate and, further, magnets for generating a magnetic field are retained on the outer peripheral side of the nonmagnetic disk substrate, the nonmagnetic disk substrate, the magnetic bar, or the magnets disposed on the outer peripheral side of the nonmagnetic disk substrate is rotated using the center of the circular hole of the nonmagnetic disk substrate as a center axis.

In the magnetic abrasive finishing, the abrasive material may be one in which the magnetic particles and the abrasive particles are mixed with each other or one in which the magnetic particles and the abrasive particles are integrated with each other.

As a material of the magnetic particles contained in the abrasive material, a material having a high magnetic permeability is preferable. Since the high magnetic-permeability material exhibits a high magnetic susceptibility, it can realize an excellent processing force by receiving the utilizing magnetic field. As magnetic particles of such a high magnetic-permeability material, for example, Fe-based magnetic particles are known. Fe is a material having a high saturation magnetic moment and therefore the Fe-based magnetic particles are particularly preferable. As such Fe-based magnetic particles, use can be made of iron oxide magnetic particles such as ferrite-based or magnetite-based magnetic particles.

As the kind of shape of the magnetic particles, use can be made of spherical particles, needle-shaped particles, or amorphous particles. The spherical particles preferably have a particle size of about 10 µm to 300 µm. The needle-shaped particles preferably have a diameter of 10 µm to 300 µm and a length of about 1 to 2 mm. The amorphous particles are preferably electrolytic iron powder of about 50 to 200 mesh. Likewise, it may also be a magnetic fluid or a magnetic viscoelastic fluid. By using such a magnetic particle material, the end face on the inner peripheral side of the circular hole at the center portion of the nonmagnetic disk substrate can be efficiently polished.

As the abrasive particles contained in the abrasive material, use can be made of abrasive particles that exhibit a polishing capability against the nonmagnetic disk substrate, for example, cerium oxide abrasive particles, colloidal silica abrasive particles, alumina abrasive particles, or diamond abrasive particles. By setting the particle size of the abrasive particles to 0.5 µm to 3 µm, the end face on the inner peripheral side of the circular hole at the center portion of the nonmagnetic disk substrate can be satisfactorily polished.

The abrasive material may be a dry type (powder abrasive particles) or a wet type (free abrasive particles). In terms of preferably realizing the abrasive action, however, the free abrasive particles are preferable.

As means for generating the magnetic field to be utilized in the magnetic abrasive finishing, a magnet (permanent magnet or electromagnet) can be used. As the permanent magnet, a rare earth-based permanent magnet can be used. Since a rare earth element has 4f electrons and is a magnet having high internal energy, an effective magnetic field gradient can be generated.

As the nonmagnetic disk substrate used in this invention, it is preferable to select a glass disk substrate. This is because the glass substrate can realize excellent smoothness by mirror polishing and, further, since the hardness is high and the rigidity is high, it is excellent in shock resistance. As glass preferable for a material of the glass disk substrate, aluminosilicate glass can be used. This is because the aluminosilicate glass can realize an excellent smooth mirror surface and enables manufacturing a substrate for a magnetic disk having an excellent smooth mirror surface and, by performing, for example, chemical strengthening, it is capable of increasing a breaking strength thereof.

It is preferable that the surface roughness of the end face on the inner peripheral side of the circular hole at the center portion of the nonmagnetic disk substrate to be polished by the magnetic abrasive finishing be set to 0.5 µm or less by Ra. By polishing such an end face according to the magnetic abrasive finishing, it is possible obtain the end face polished into a mirror surface excellent in smoothness. The surface roughness obtained by the magnetic abrasive finishing is preferably set to a mirror surface of 0.1 µm or less by Ra and 1 µm or less by Rmax. Notation of Rmax and Ra follows the Japanese Industrial Standard (JISB0601). In a magnetic disk using the thus manufactured substrate for the magnetic disk, the high cleaning of the surface of the nonmagnetic disk substrate is realized so that the problem caused by foreign matter on the surface of the nonmagnetic disk substrate, i.e. the head crash and thermal asperity trouble, can be securely prevented.

It is preferable that the polishing of the end face on the inner peripheral side of the circular hole by the magnetic abrasive finishing be carried out by concentrically placing a plurality of nonmagnetic disk substrates in layers and simultaneously polishing end faces on the inner peripheral side of circular holes of the respective nonmagnetic disk substrates. By employing such a manufacturing method, a large number of disk substrates can be stably manufactured and supplied.

Specifically, this invention has the following structures.

This invention according to claim 1 is a method of manufacturing a substrate for a magnetic disk, having a step of polishing at least an end face on an inner peripheral side of a circular hole of a nonmagnetic disk substrate having the circular hole at a center portion thereof, characterized in that the end face on the inner peripheral side of the circular hole is polished by magnetic abrasive finishing in which a magnetic field is formed at least on the inner peripheral side of the circular hole, an abrasive material containing magnetic particles and abrasive particles is held in the circular hole by the magnetic field and, by moving the magnetic field with respect to the end face on the inner peripheral side of the circular hole, the abrasive material is moved with respect to the end face on the inner peripheral side of the circular hole to thereby polish the end face on the inner peripheral side of the circular hole.

This invention according to claim 2 is, in a method of manufacturing a substrate for a magnetic disk according to claim 1, characterized in that the abrasive material in which the magnetic particles and the abrasive particles are integrated with each other is used in the magnetic abrasive finishing.

This invention according to claim 3 is, in a method of manufacturing a substrate for a magnetic disk according to claim 1 or 2, characterized in that the magnetic particles contained in the abrasive material are ferrite-based magnetic particles.

This invention according to claim 4 is, in a method of manufacturing a substrate for a magnetic disk according to any one of claims 1 to 3, characterized in that the abrasive particles contained in the abrasive material are cerium oxide abrasive particles, colloidal silica abrasive particles, alumina abrasive particles, or diamond abrasive particles.

This invention according to claim 5 is, in a method of manufacturing a substrate for a magnetic disk according to any one of claims 1 to 4, characterized in that the abrasive material is formed into a slurry by adding a liquid so as to use the abrasive particles as free abrasive particles.

This invention according to claim 6 is, in a method of manufacturing a substrate for a magnetic disk according to any one of claims 1 to 5, characterized in that the magnetic abrasive finishing is performed by disposing a magnet in the circular hole and using a magnetic field formed by the magnet.

This invention according to claim 7 is, in a method of manufacturing a substrate for a magnetic disk according to any one of claims 1 to 5, characterized in that the magnetic abrasive finishing is performed by disposing a magnet on an outer peripheral side of the nonmagnetic disk substrate and using a magnetic field formed by the magnet.

This invention according to claim 8 is, in a method of manufacturing a substrate for a magnetic disk according to claim 6 or 7, characterized in that a rare earth-based permanent magnet or an electromagnet is used as the magnet.

This invention according to claim 9 is, in a method of manufacturing a substrate for a magnetic disk according to any one of claims 1 to 8, characterized in that the nonmagnetic disk substrate is a glass disk substrate.

This invention according to claim 10 is, in a method of manufacturing a substrate for a magnetic disk according to any one of claims 1 to 9, characterized in that a plurality of nonmagnetic disk substrates are concentrically placed in layers and end faces on the inner peripheral side of circular holes of the nonmagnetic disk substrates are simultaneously polished.

This invention according to claim 11 is, in a method of manufacturing a substrate for a magnetic disk according to any one of claims 1 to 10, characterized in that a chamfered face provided at an end face portion on the inner peripheral side of the nonmagnetic disk substrate is polished by the magnetic abrasive finishing.

This invention according to claim 12 is characterized by comprising retaining means for retaining a nonmagnetic disk substrate having a circular hole at a center portion thereof, magnetic field forming means for forming a magnetic field at least on an inner peripheral side of the circular hole of the nonmagnetic disk substrate, and magnetic field rotation means for rotating the magnetic field with respect to an end face on the inner peripheral side of the circular hole, wherein an abrasive material containing magnetic particles and abrasive particles is held in the circular hole at the center portion of the nonmagnetic disk substrate by the magnetic field formed by the magnetic field forming means and, by rotating the magnetic field with respect to the end face on the inner peripheral side of the circular hole by the magnetic field rotation means, the abrasive material is rotated with respect to the end face on the inner peripheral side of the circular hole to thereby polish the end face on the inner peripheral side of the circular hole.

This invention according to claim 13 is, in an apparatus for manufacturing a substrate for a magnetic disk according to claim 12, characterized in that at least part of the retaining means is made of an insulating material.

This invention according to claim 14 is characterized by forming at least a magnetic layer on a main surface portion of the substrate for the magnetic disk manufactured by a method of manufacturing a substrate for a magnetic disk according to any one of claims 1 to 10.

Efeect of the Invention

In a method of manufacturing a substrate for a magnetic disk in accordance with this invention according to claim 1, the end face on the inner peripheral side of the circular hole at the center portion of the nonmagnetic disk substrate can be easily and satisfactorily polished by the use of the magnetic abrasive finishing.

In this invention according to claim 2, by the use of the abrasive material in which the magnetic particles and the abrasive particles are integrated with each other in the magnetic abrasive finishing, the end face on the inner peripheral side of the circular hole at the center portion of the nonmagnetic disk substrate can be satisfactorily polished.

In this invention according to claim 3, since the magnetic particles contained in the abrasive material are ferrite-based magnetic particles, the end face on the inner peripheral side of the circular hole at the center portion of the nonmagnetic disk substrate can be efficiently polished.

In this invention according to claim 4, since the abrasive particles contained in the abrasive material are cerium oxide abrasive particles, colloidal silica abrasive particles, alumina abrasive particles, or diamond abrasive particles, the end face on the inner peripheral side of the circular hole at the center portion of the nonmagnetic disk substrate can be satisfactorily polished.

In this invention according to claim 5, since the abrasive material is formed into a slurry by adding a liquid so as to use the abrasive particles as free abrasive particles, the end face on the inner peripheral side of the circular hole at the center portion of the nonmagnetic disk substrate can be satisfactorily polished.

In this invention according to claim 6, since the magnetic abrasive finishing is performed by disposing a magnet in the circular hole and using a magnetic field formed by this magnet, the end face on the inner peripheral side of the circular hole at the center portion of the nonmagnetic disk substrate can be efficiently polished.

In this invention according to claim 7, since the magnetic abrasive finishing is performed by disposing a magnet body on an outer peripheral side of the nonmagnetic disk substrate and using a magnetic field formed by this magnet, the end face on the inner peripheral side of the circular hole at the center portion of the nonmagnetic disk substrate can be efficiently polished.

In this invention according to claim 8, since a rare earth-based permanent magnet or an electromagnet is used as the magnet, the end face on the inner peripheral side of the circular hole at the center portion of the nonmagnetic disk substrate can be efficiently polished.

In this invention according to claim 9, since the nonmagnetic disk substrate is a glass disk substrate, it is possible to manufacture a substrate for a magnetic disk having excellent smoothness, high hardness, and high rigidity.

In this invention according to claim 10, since a plurality of nonmagnetic disk substrates are concentrically placed in layers and end faces on the inner peripheral side of circular holes of the nonmagnetic disk substrates are simultaneously polished, a large number of disk substrates can be stably manufactured and supplied.

In this invention according to claim 11, since a chamfered face provided at an end face portion on the inner peripheral side of the nonmagnetic disk substrate can be satisfactorily polished, the high cleaning of the end face portion on the inner peripheral side is realized so that the problem caused by foreign matter on the surface of the nonmagnetic disk substrate, i.e. the head crash and thermal asperity trouble, can be prevented.

In this invention according to claim 12, since there are provided retaining means for retaining a plurality of nonmagnetic disk substrates, each having a circular hole at a center portion thereof, so as to be concentrically placed in layers, magnetic field forming means for forming a magnetic field at least on the inner peripheral side of the circular holes of the nonmagnetic disk substrates, and magnetic field rotation means for rotating the magnetic field with respect to end faces on the inner peripheral side of the circular holes, a large number of disk substrates can be stably manufactured and supplied.

In this invention according to claim 13, since at least part of the retaining means is made of an insulating material, generation of eddy current caused by the magnet is prevented to thereby prevent generation of heat during the magnetic abrasive finishing so that the end face on the inner peripheral side of the circular hole at the center portion of the nonmagnetic disk substrate can be efficiently polished and a large number of disk substrates can be stably manufactured and supplied.

In this invention according to claim 14, the high cleaning of the surface of the nonmagnetic disk substrate is realized so that it is possible to manufacture a magnetic disk that can securely prevent the problem caused by foreign matter on the surface of the nonmagnetic disk substrate, i.e. the head crash and thermal asperity trouble.

That is, this invention is, even if a circular hole at a center portion of a nonmagnetic disk substrate is reduced in diameter, capable of easily and satisfactorily polishing at least an end face on the inner peripheral side of the circular hole into a mirror surface, thereby enabling providing stable-quality disk substrates and magnetic disks at low prices and in large quantities, and of preventing the thermal asperity trouble and head crash with respect to a magnetic disk using the subject substrate for the magnetic disk, thereby serving to increase the information recording surface density in the magnetic disk.

BRIEF DESCRIPTION OF THE DRAWINGS

FIG. 1 A perspective view showing a structure of a substrate for a magnetic disk manufactured by a method of manufacturing a substrate for a magnetic disk according to this invention.

FIG. 2 A sectional view showing a process of polishing end faces on the inner peripheral side of circular holes with respect to a plurality of nonmagnetic disk substrates in the method of manufacturing the substrate for the magnetic disk.

FIG. 3 An exemplary diagram showing the state where permanent magnets are disposed outside nonmagnetic disk substrates in the method of manufacturing the substrate for the magnetic disk.

FIG. 4 A front view showing the state where permanent magnets are disposed both outside nonmagnetic disk substrates and in circular holes of the nonmagnetic disk substrates in the method of manufacturing the substrate for the magnetic disk.

FIG. 5 A side view showing the state where an abrasive material is captured by a magnetic field in the circular holes of the nonmagnetic disk substrates in the method of manufacturing the substrate for the magnetic disk.

FIG. 6 A side view showing a structure of an apparatus for manufacturing a substrate for a magnetic disk according to this invention.

FIG. 7 A sectional view showing a structure of a substrate case of the apparatus for manufacturing the substrate for the magnetic disk.

FIG. 8 A sectional view showing a structure of a rotation magnet of the apparatus for manufacturing the substrate for the magnetic disk.

FIG. 9 A perspective view showing a structure of a permanent magnet forming the rotation magnet of the apparatus for manufacturing the substrate for the magnetic disk.

FIG. 10 A perspective view showing another example of a structure of a permanent magnet forming the rotation magnet of the apparatus for manufacturing the substrate for the magnetic disk.

FIG. 11 A side view showing another example of a structure of the main part of an apparatus for manufacturing a substrate for a magnetic disk according to this invention.

FIG. 12 A front view showing the another example of the structure of the main part of the apparatus for manufacturing the substrate for the magnetic disk according to this invention.

FIG. 13 A sectional view of the inner peripheral side of a nonmagnetic disk substrate according to this invention, wherein edge portions on both sides of an end face are chamfered.

DESCRIPTION OF SYMBOLS 1 circular hole
2 substrate for magnetic disk
3a permanent magnet
3b magnet bar
4 abrasive material
5 substrate case

BEST MODE FOR CARRYING OUT THE INVENTION

Hereinbelow, the best mode for carrying out this invention will be described with reference to the drawings.

A substrate for a magnetic disk manufactured by a method of manufacturing a substrate for a magnetic disk according to this invention is used, for example, as a disk substrate of a magnetic disk mounted in an HDD (Hard Disk Drive) or the like. This magnetic disk is, for example, a recording medium that enables high-density information signal recording and reproduction according to a perpendicular magnetic recording system.

This magnetic disk is manufactured as a magnetic disk having a predetermined diameter such as, for example, naturally a 1.8-inch magnetic disk having an inner diameter of 12 mm or less, an outer diameter of 48 mm or less, and a thickness of 0.501 mm or less, a 1.0-inch magnetic disk having an inner diameter of 7 mm or less, an outer diameter of 27.4 mm or less, and a thickness of 0.381 mm or less, a 0.8-inch magnetic disk having an inner diameter of 6 mm or less, an outer diameter of 22 mm or less, and a thickness of 0.381 mm or less, a 2.5-inch magnetic disk, or a 3.5-inch magnetic disk. Herein, the "inner diameter" represents an inner diameter of a circular hole at a center portion of the disk substrate.

FIG. 1 is a perspective view showing a structure of a substrate for a magnetic disk manufactured by a method of manufacturing a substrate for a magnetic disk according to this invention.

The method of manufacturing the substrate for the magnetic disk according to this invention is, as shown in FIG. 1, a method of manufacturing a substrate for a magnetic disk having a process of polishing at least an end face on the inner peripheral side of a circular hole 1 of a nonmagnetic disk substrate 2 having the circular hole 1 at a center portion thereof. In this method of manufacturing the substrate for the magnetic disk, the polishing of the end face on the inner peripheral side of the circular hole 1 is carried out by magnetic abrasive finishing.

The magnetic abrasive finishing is a method of using an abrasive material composed of magnetic particles and abrasive particles and generating an abrasive pressure by the use of magnetism to thereby precisely polish the surface of a material to be polished. In this magnetic abrasive finishing, the material to be polished and a magnetic field are relatively moved by moving the material to be polished and/or the magnetic field so as to relatively move the abrasive material held by the magnetic field and the material to be polished, thereby polishing the surface of the material to be polished.

In this invention, as a material of the magnetic particles contained in the abrasive material, there is no particular limitation as long as it is a magnetic body, but it is preferably a material having a high magnetic permeability. This is because the high magnetic-permeability material exhibits a high magnetic susceptibility and therefore can realize an excellent processing force (abrasive pressure) by receiving the utilizing magnetic field.

As such a high magnetic-permeability material, for example, an Fe-based material can be used. Fe is a material having a high saturation magnetic moment and therefore is particularly preferable as a material of the magnetic particles. As such an Fe-based material, use can be made of an iron oxide magnetic material such as a ferrite-based material or a magnetite-based material.

The shape and size of the magnetic particles can be properly selected. As the kind of shape of the magnetic particles, use can be made of spherical particles, needle-shaped particles, or amorphous particles. The spherical particles preferably have a particle size of about 10 μm to 300 μm. The needle-shaped particles preferably have a diameter of 10 μm to 300 μm and a length of about 1 to 2 mm. The amorphous particles are preferably electrolytic iron powder of about 50 to 200 mesh.

As the abrasive particles contained in the abrasive material, as long as it is abrasive particles that exhibit a polishing capability against the nonmagnetic disk substrate, use can be made thereof with no particular limitation. For example, use can be made of cerium oxide ($CeO_2$) abrasive particles, colloidal silica abrasive particles, alumina abrasive particles, diamond abrasive particles, or the like. In the case where a glass substrate is used as the nonmagnetic disk substrate, the cerium oxide abrasive particles are preferable as the abrasive particles contained in the abrasive material.

The particle size of the abrasive particles can be properly selected but is preferably set, for example, to about 0.5 μm to 3 μm.

The abrasive material may be a dry type (powder abrasive particles) or a wet type (free abrasive particles). In terms of preferably realizing the abrasive action, the wet type (free abrasive particles) is preferable. In order to use the abrasive material as the wet type (free abrasive particles), it is preferable to add a liquid such as water (pure water) to the abrasive material containing the magnetic particles and the abrasive particles and use the abrasive material as a slurry.

Further, as the abrasive material, use can also be made of one in the form of the magnetic particles and the abrasive particles that are integrated with each other. The abrasive material in the form of the integrated magnetic particles and abrasive particles is such that spheres of the high magnetic-permeability material such as the Fe-based material serve as cores and the abrasive particle material such as cerium oxide adheres as a layer to an outer peripheral portion of each of the spheres. Such an abrasive material can be produced by wrapping each sphere of the high magnetic-permeability material with a resin layer of phenol resin or the like, applying to the wrapped spheres, for example, an aqueous solution containing 10 wt % to 20 wt % of cerium oxide, and then burning them.

In this invention, a magnet (permanent magnet or electromagnet) can be used as means for generating the magnetic field to be utilized. As the permanent magnet, it is preferable to use a rare earth-based permanent magnet. Since a rare earth element has 4f electrons, the rare earth-based permanent magnet is a magnet having high internal energy and is capable of generating an effective magnetic field gradient.

As such a rare earth-based magnet, use can be made of a magnet having high internal energy, such as a neodymium-based magnet (e.g. NdFeB-based magnet) or a samarium-based magnet (e.g. SmCo-based magnet). In terms of satisfactorily realizing the abrasive action, the neodymium-based magnet is particularly preferable.

On the other hand, this invention exhibits particularly excellent usefulness in manufacturing a substrate for a magnetic disk in which the inner diameter of a circular hole at a center portion thereof is 12 mm or less. This is because in the case where the inner diameter of the circular hole at the center portion is 12 mm or less, it is difficult to polish an end face on the inner peripheral side of the circular hole according to the conventional polishing method using the polishing brush or the polishing pad.

In view of this, this invention is particularly preferable for polishing an end face of a substrate for a magnetic disk such as a 1.8-inch magnetic disk or a magnetic disk having a smaller diameter as compared thereto. As the substrate for such a small-diameter magnetic disk, for example, a substrate for a 0.8-inch to 1.8-inch magnetic disk can be used.

Then, as the nonmagnetic disk substrate, it is preferable to select a glass substrate. This is because the glass substrate can realize excellent smoothness by mirror polishing and, since the hardness is high and the rigidity is high, it is excellent in shock resistance. Particularly, since high shock resistance is required for a magnetic disk for use in a hard disk drive (HDD) mounted in portable (carrying) or vehicle information equipment, it is highly useful to use the glass substrate in such a magnetic disk.

Although glass is a brittle material, the breaking strength thereof can be improved by a strengthening treatment such as chemical strengthening or heat-cold strengthening, or means of crystallization. As glass preferable for a material of such a glass substrate, aluminosilicate glass can be used. This is because the aluminosilicate glass can realize an excellent smooth mirror surface and is capable of increasing its breaking strength by performing, for example, chemical strengthening.

The aluminosilicate glass is preferably glass for chemical strengthening which contains, as main components, $SiO_2$: 62 to 75 weight %, $Al_2O_3$: 5 to 15 weight %, $Li_2O$: 4 to 10 weight %, $Na_2O$: 4 to 12 weight %, and $ZrO_2$: 5.5 to 15 weight %, wherein the weight ratio between $Na_2O$ and $ZrO_2$ is 0.5 to 2.0 and the weight ratio between $Al_2O_3$ and $ZrO_2$ is 0.4 to 2.5.

Further, in such a glass substrate, in order to eliminate projections on the surface of the glass substrate caused by undissolved $ZrO_2$, use is preferably made of glass for chemical strengthening that contains 57 to 74 mol % of $SiO_2$, 0 to 2.8 mol % of $ZrO_2$, 3 to 15 mol % of $Al_2O_3$, 7 to 16 mol % of $LiO_2$, and 4 to 14 mol % of $Na_2O$. By chemical strengthening, the aluminosilicate glass having such a composition increases in flexural strength, has a large depth of a compressive stress layer, and is excellent in Knoop hardness.

In this invention, it is preferable that edge portions on both sides of the end face be chamfered in the nonmagnetic disk substrate. This is because, with the chamfered edge portions of the end face, the nonmagnetic disk substrate increases in breaking strength and can be satisfactorily polished by the magnetic abrasive finishing.

FIG. 13 is a sectional view of the inner peripheral side of a nonmagnetic disk substrate according to this invention in which edge portions on both sides of an end face are chamfered.

As shown in FIG. 13, in the nonmagnetic disk substrate 2 in which the edge portions of the end face are chamfered, chamfered faces 1b are formed between main surface portions 2a and a side face portion 1a so as to be in contact with the main surface portions 2a and the side face portion 1a. In the description about this invention, the side face portion 1a and the chamfered faces 1b are collectively called an end face.

In this invention, it is preferable that the surface roughness of the side face portion 1a and the chamfered faces 1b serving as the end face of the nonmagnetic disk substrate to be subjected to the magnetic abrasive finishing be set to 0.5 µm or less by Ra. By polishing such a surface according to the magnetic abrasive finishing, the end face can be polished into a mirror surface excellent in smoothness. It is preferable that the polishing by the magnetic abrasive finishing in this invention form the side face portion 1a and the chamfered faces 1b being the end face into a mirror surface having a surface roughness of 0.1 µm or less by Ra and 1 µm or less by Rmax. Notation of Rmax and Ra follows the Japanese Industrial Standard (JISB0601). By polishing the end face so as to obtain such a mirror surface, the head crash and thermal asperity trouble can be securely prevented in a magnetic disk formed by using this nonmagnetic disk substrate.

In this invention, not only the end face on the inner peripheral side of the nonmagnetic disk substrate but also an end face on the outer peripheral side may be polished by the magnetic abrasive finishing as described above.

Next, description will be given of sequences of polishing end faces on the inner peripheral side of circular holes at center portions of nonmagnetic disk substrates according to the magnetic abrasive finishing in this invention.

FIG. 2 is a sectional view showing a process of polishing end faces on the inner peripheral side of circular holes with respect to a plurality of nonmagnetic disk substrates in the method of manufacturing the substrate for the magnetic disk according to this invention.

First, as shown in FIG. 2, a plurality of nonmagnetic disk substrates 2 are concentrically placed in layers and retained. Each nonmagnetic disk substrate 2 has already been subjected to chamfering and so on at the inner and outer peripheries in a preceding process.

Then, a magnetic field is formed near end faces on the inner peripheral side of circular holes 1 at center portions of the nonmagnetic disk substrates 2. In order to form such a magnetic field, consideration is made of a method of disposing permanent magnets outside a cylindrical body formed by the nonmagnetic disk substrates 2, a method of inserting/disposing a bar-shaped permanent magnet in the circular holes 1 at the center portions of the nonmagnetic disk substrates 2, or a method of disposing permanent magnets both outside the cylindrical body formed by the nonmagnetic disk substrates 2 and in the circular holes 1 at the center portions of the nonmagnetic disk substrates 2.

FIG. 3 is an exemplary diagram showing the state where permanent magnets are disposed outside the nonmagnetic disk substrates 2.

As shown in FIG. 3, when permanent magnets 3a are disposed outside the cylindrical body formed by the nonmagnetic disk substrates 2, a magnetic field is formed in the circular holes 1 at the center portions of the nonmagnetic disk substrates 2. The strength of this magnetic field is expressed as H (dH/dx) given that a magnetic field strength possessed by the permanent magnet 3a is H. (dH/dx) is a change rate of a magnetic force between magnetic poles in the permanent magnet 3a.

FIG. 4 is a front view showing the state where permanent magnets are disposed both outside the nonmagnetic disk substrates 2 and in the circular holes 1 of the nonmagnetic disk substrates 2.

As shown in FIG. 4, when permanent magnets 3a and a magnet bar 3b are disposed both outside the cylindrical body formed by the nonmagnetic disk substrates 2 and in the circular holes 1 of the nonmagnetic disk substrates 2, a magnetic field formed in the circular holes 1 at the center portions of the nonmagnetic disk substrates 2 can be stronger. In this case, as shown in FIG. 2, the position of the magnet bar 3b is a position where the magnet bar 3b is received in all the circular holes 1 of the retained nonmagnetic disk substrates 2.

Subsequently, an abrasive material 4 is supplied toward the inside of the circular holes of the nonmagnetic disk substrates.

FIG. 5 is a side view showing the state where the abrasive material is captured by the magnetic field in the circular holes 1 of the nonmagnetic disk substrates 2.

As shown in FIG. 5, when the magnet bar 3b is used, the abrasive material 4 is captured and held by the magnetic field formed by the permanent magnet 3a or the magnet bar 3b between the outer periphery of the magnet bar 3b, and the side face portions 1a and the chamfered faces 1b being the end faces on the inner peripheral side of the circular holes 1 of the nonmagnetic disk substrates. In this manner, because the abrasive material 4 is held between the outer periphery of the magnet bar 3b, and the side face portions 1a and the chamfered faces 1b being the end faces on the inner peripheral side of the circular holes 1 of the nonmagnetic disk substrates, the chamfered faces 1b can also be satisfactorily polished like the side face portions 1a. Thereby, the high cleaning of the end face portion on the inner peripheral side is realized so that it is possible to prevent the problem caused by foreign matter on the surface of the nonmagnetic disk substrate, i.e. the head crash and thermal asperity trouble.

Then, polishing is carried out by rotating the nonmagnetic disk substrates 2 and the permanent magnets 3a or the magnet bar 3b in mutually opposite directions about a center axis. In this case, the relative rotational speed between the nonmagnetic disk substrates 2 and the permanent magnets 3a or the magnet bar 3b is preferably about 5000 rpm to 20000 rpm. On the other hand, the polishing may also be performed by rotating only the nonmagnetic disk substrates 2 without rotating the permanent magnets 3a and the magnet bar 3b. In this case, the rotational speed of the nonmagnetic disk substrates 2 is preferably about 5000 rpm to 20000 rpm.

An abrasive force in this event is given as follows.

$Fx = k \cdot V \cdot X \cdot H \, (dH/dx)$, where k is a constant, V is a volume of the abrasive material, X is a magnetizing force of the magnetic particles contained in the abrasive material, and H (dH/dx) is, as described before, a magnetic field strength at the end faces on the inner peripheral side of the circular holes 1. In this manner, the abrasive force Fx is a value that changes depending on the volume V of the abrasive material, the magnetizing force X of the magnetic particles contained in the abrasive material, and the magnetic field strength H (dH/dx) of the magnetic field strength polishing portion at the end faces on the inner peripheral side. For example, in terms of a design for a magnetic abrasive finishing apparatus, the magnetic field strength at the center portions of the circular holes 1 of the nonmagnetic disk substrates is preferably 1000(G) or more.

In this polishing, the nonmagnetic disk substrates 2 and the permanent magnets 3a or the magnet bar 3b may be relatively moved reciprocatingly in axial directions at a constant period.

Then, when a predetermined amount of polishing is finished, the apparatus is stopped. Upon detaching the nonmagnetic disk substrates 2 from the apparatus, it is necessary to move the permanent magnets 3a or the magnet bar 3b to a position that does not interfere with detaching and attaching of the nonmagnetic disk substrates 2.

By the polishing according to the magnetic abrasive finishing as described above, the side face portion 1a and the chamfered faces 1b being the end face on the inner peripheral side of the circular hole of each nonmagnetic disk substrate are formed into a mirror surface having a surface roughness of 0.1 µm or less by Ra and 1 µm or less by Rmax.

The material forming the glass substrate used in this invention is not limited to the foregoing material. That is, as a material of the glass substrate, there can be cited, for example, other than the foregoing aluminosilicate glass, soda-lime glass, soda aluminosilicate glass, aluminoborosilicate glass, borosilicate glass, quartz glass, chain silicate glass, glass ceramics such as crystallized glass, or the like.

By the use of the substrate for the magnetic disk, in which the end face on the inner peripheral side of the circular hole is polished as described above, at least a magnetic layer is formed on the main surface portion of the substrate for the magnetic disk so that it is possible to form a magnetic disk adapted to prevent the head crash and thermal asperity trouble.

The magnetic layer is preferably a Co—Pt-based alloy magnetic layer having a high anisotropic magnetic field (Hk). Further, in terms of improving crystal orientation and achieving more uniform and finer grains of the magnetic layer, an underlayer may properly be formed between the substrate for the magnetic disk and the magnetic layer. As a film forming method for these underlayer and magnetic layer, use can be made of, for example, a DC magnetron sputtering method.

On the magnetic layer, it is preferable to provide a protection layer for protecting the magnetic layer. As a material of the protection layer, a carbon-based protection layer can be used. Use can be made of hydrogenated carbon or nitrogenated carbon for the carbon-based protection layer. For the formation of the protection layer, use can be made of a plasma CVD method or the DC magnetron sputtering method.

Further, on the protection layer, it is preferable to form a lubricating layer for softening an impact from the magnetic head. As the lubricating layer, a perfluoropolyether-based lubricating layer can be used. Particularly, alcohol-denatured perfluoropolyether lubricating layer having a hydroxyl group excellent in affinity with the protective layer is preferable. This lubricating layer can be formed by the use of a dip method.

Next, description will be given of apparatuses each for manufacturing a substrate for a magnetic disk according to this invention.

FIG. 6 is a side view showing a structure of an apparatus for manufacturing a substrate for a magnetic disk according to this invention.

As shown in FIG. 6, this manufacturing apparatus has a hollow cylindrical substrate case 5 serving as retaining means for receiving and retaining a plurality of nonmagnetic disk substrates to be polished in the state where they are concentrically placed in layers.

As a material of this substrate case 5, it is preferable to use an insulating material at least partly in order to prevent generation of eddy current caused by the magnets disposed on the outer peripheral side during magnetic abrasive finishing. This is because if no insulating material is used as the material of the substrate case 5, when, for example, the relative rotational speed between the nonmagnetic disk substrates 2 and the permanent magnets 3a or the magnet bar 3b is set to a high rotational speed of about 5000 rpm to 20000 rpm during magnetic abrasive finishing, high heat is generated due to the eddy current from the magnets so that the end faces of the circular holes at the center portions of the nonmagnetic disk substrates cannot be polished efficiently.

Although the apparatus is placed horizontally in FIG. 6, it may be placed vertically.

FIG. 7 is a sectional view showing a structure of the substrate case of the apparatus for manufacturing the substrate for the magnetic disk.

As shown in FIG. 7, the substrate case 5 can concentrically receive therein, for example, about 50, about 100, or about 200 nonmagnetic disk substrates 2 at a time. The substrate case 5 is configured such that, by screwing a presser flange 6 from the axial direction, the nonmagnetic disk substrates 2 received therein are retained without being affected by rotation of the substrate case 5, due to friction between the main surface portions of the respective nonmagnetic disk substrates 2.

As shown in FIG. 6, the substrate case 5 is retained rotatably about an axis over a rotation support platform 7 via a housing 8. The substrate case 5 is operated by an unshown drive motor so as to be rotated about the shaft at a predetermined rotational speed. On the other hand, the housing 8 is supported by a direct-acting guide 9 so as to be reciprocatingly movable in the axial directions of the substrate case 5 as shown by arrows A in FIG. 6. The housing 8 is operated by an unshown drive motor and an unshown cam mechanism so as to be reciprocatingly moved in the axial directions of the substrate case 5 at a constant period.

Then, the bar-shaped magnet bar 3b is inserted into the circular holes 1 of the large number of nonmagnetic disk substrates 2 retained in the substrate case 5. The magnet bar 3b is connected to a rotation shaft 11 of a drive motor 10 so as to be rotatable about an axis in both forward and reverse directions at a predetermined rotational speed. The magnet bar 3b is set so that the position of the rotation center of the magnet bar 3b coincides with the rotation center of the substrate case 5.

The respective rotational speeds of the magnet bar 3b and the substrate case 5 are set so that the relative rotational speed becomes about 5000 rpm to 20000 rpm.

The magnet bar 3b has a diameter (thickness) such that when the magnet bar 3b is inserted into the circular holes 1 of the nonmagnetic disk substrates 2, a gap between itself and the end faces on the inner peripheral side of the circular holes 1 becomes about 100 µm to 1 mm. For example, in the case where the inner diameter of the circular hole 1 is 7 mm, the diameter of the magnet bar 3b is about 5 mm to 6.8 mm, while, in the case where the inner diameter of the circular hole 1 is 6 mm, the diameter of the magnet bar 3b is about 4 mm to 5.8 mm.

FIG. 8 is a sectional view showing a structure of the magnet bar 3b.

As shown in FIG. 8, the magnet bar 3b is composed of a tubular case 11 and a plurality of cylindrical permanent magnets 12 filled therein.

FIG. 9 is a perspective view showing a structure of the permanent magnet forming the magnet bar 3b.

As shown in FIG. 9, each permanent magnet 12 forming the magnet bar 3b is preferably magnetized in the state where magnetic poles exist on the peripheral side thereof. By the use of such a permanent magnet 12, it is possible to generate magnetic flux directed toward the end faces on the inner peripheral side of the circular holes 1 of the nonmagnetic disk substrates 2 so that a magnetic field can be formed near the end faces on the inner peripheral side of the circular holes 1.

FIG. 10 is a perspective view showing another example of a structure of the permanent magnet forming the magnet bar 3b.

As shown in FIG. 10, the permanent magnet 12 may be multipole magnetized in the circumferential direction thereof.

FIG. 11 is a side view showing another example of a structure of the main part of an apparatus for manufacturing a substrate for a magnetic disk according to this invention.

FIG. 12 is a front view showing the another example of the structure of the main part of the apparatus for manufacturing the substrate for the magnetic disk according to this invention.

In this apparatus for manufacturing the substrate for the magnetic disk, it may be configured that a plurality of permanent magnets 3a are disposed on the outer peripheral side of the substrate case 5 as shown in FIG. 11. Also in this case, the substrate case 5 is rotated about an axis at a predetermined rotational speed, while, the plurality of permanent magnets 3a on the outer peripheral side are rotated around the substrate case 5 at a predetermined rotational speed as shown by an arrow R in FIG. 12. The respective rotational speeds of the substrate case 5 and the plurality of permanent magnets 3a are set so that the relative rotational speed becomes about 5000 rpm to 20000 rpm. As shown by arrows A in FIG. 11, the substrate case 5 is reciprocatingly movable in the axial directions, which is the same as described before.

In this manufacturing apparatus, electromagnets may be used instead of the permanent magnets 3a. Further, the magnet bar 3b may also be in the form of an electromagnet.

In this manufacturing apparatus, there is provided an abrasive material supply portion for supplying an abrasive material. The abrasive material may be a dry type (powder abrasive particles) or a wet type (free abrasive particles). In terms of preferably realizing the abrasive action, however, the wet type (free abrasive particles) is preferable. That is, it is preferable to add a liquid such as water (pure water) to the abrasive material containing magnetic particles and abrasive particles and use the abrasive material as a slurry. When the abrasive material is used as the slurry, the abrasive material supply portion can supply the liquid abrasive material into the circular holes at the center portions of the nonmagnetic disk substrates through a nozzle by the use of a pressure obtained by a pump or the like.

As the abrasive particles contained in the abrasive material, cerium oxide is used. However, other than it, use can be made of an abrasive material such as diamond, iron oxide, magnesium oxide, zirconium oxide, or manganese oxide. Preferably, one having a hardness close to a material of an object to be polished (nonmagnetic disk substrate) is desirable and, in the case of the glass substrate, cerium oxide is desirable. If the abrasive material is too hard, the end face of the glass substrate is damaged, which is thus not preferable. On the other hand, if the abrasive material is too soft, the end face of the glass substrate cannot be a mirror surface, which is thus not preferable. As the average particle size of the abrasive particles, 0.5 µm to 3 µm is preferable. In the case of exceeding 3 µm, since the particle size of the abrasive material is large, the surface roughness of the face after polishing becomes large, which is thus not preferable. Further, as described before, use can also be made, as the abrasive material, of one in the form of the magnetic particles and the abrasive particles that are integrated with each other.

The manner of supplying the abrasive material by the abrasive material supply portion is not particularly limited and there can be cited, for example, a manner of spraying, blowing, discharging, application, or the like by the use of a single water stream, shower, waterdrops, or the like.

In this manufacturing apparatus, there may be provided an abrasive material recovery portion for recovering the abrasive material supplied from the abrasive material supply portion, and a circulation mechanism for cleaning the recovered abrasive material and circulating it again to the abrasive material supply portion.

The substrate for the magnetic disk manufactured by the method and apparatus for manufacturing the substrate for the magnetic disk according to this invention can also be used as a glass substrate for a magneto-optical disk that dislikes fine particles generated from an end face of the glass substrate or a substrate for an electron-optical disk such as an optical disk. Further, the method and apparatus for manufacturing the substrate for the magnetic disk according to this invention can also be employed in a process of polishing a brittle material such as glass carbon, a crystal material (including a single-crystal material), or a ceramic material, a metal material, or the like.

EXAMPLE 1

Hereinbelow, examples of this invention will be described in detail.

In this example 1, substrates for magnetic disks were manufactured through the following processes.

(1) Shaping Process, Lapping Process Molten aluminosilicate glass was formed into a disk shape by pressing to thereby obtain glass disks.

As the aluminosilicate glass, use was made of glass for chemical strengthening containing, as main components, 57 to 74 mol % of $SiO_2$, 0 to 2.8 mol % of $ZrO_2$, 3 to 15 mol % of $Al_2O_3$, 7 to 16 mol % of $LiO_2$, and 4 to 14 mol % of $Na_2O$.

Subsequently, lapping was applied to the main surfaces of the obtained glass disk substrates. In the lapping process, the lapping was carried out by the use of a double-side lapping machine and alumina abrasive particles to thereby achieve predetermined dimensional accuracy and shape accuracy of the glass substrates. Then, grinding was performed using a grindstone to thereby form a circular hole at a center portion of each glass disk and apply predetermined chamfering to an end face on the outer peripheral side and an end face on the inner peripheral side.

It was confirmed that each obtained glass disk had an inner diameter of 7 mm, an outer diameter of 27.4 mm, and a thickness of 0.381 mm, which were predetermined dimensions of a substrate for a 1.0-inch magnetic disk.

The surface shape of the glass disk surfaces was observed and the surface roughness of the main surfaces was 2 µm by Rmax and about 0.3 µm by Ra. The surface roughness of the end faces was observed and found to be 14 µm by Rmax and 0.51 µm by Ra both at side face portions and at chamfered faces.

(2) End Face Mirror Polishing Process First, with respect to the end faces on the outer peripheral side of the glass disk substrates, mirror polishing was performed by a conventionally used brush polishing method. In this event, as abrasive particles, use was made of a slurry (free abrasive particles) containing cerium oxide abrasive particles. Then, with respect to the end faces on the inner peripheral side, mirror polishing was performed by the magnetic abrasive finishing according to this invention. In order to prevent occurrence of cracks or the like on the main surfaces of the glass substrates upon performing the end face polishing by placing in layers the glass substrates, it is preferable to carry out this end face polishing process before a later-described first polishing process or before or after a later-described second polishing process.

The glass substrates having been subjected to the foregoing end face polishing were washed with water.

(First Polishing Process)

Then, the first polishing process was carried out as a main surface polishing process. This first polishing process mainly aims to remove cracks or strains remaining on the main surfaces during the foregoing lapping process. By the use of a double-side polishing machine and a hard resin polisher, main surface polishing was carried out using a planetary gear mechanism. Cerium oxide abrasive particles were used as an abrasive material.

The glass substrates subjected to the first polishing process were immersed in respective cleaning baths of neutral detergent, pure water, pure water, IPA (isopropyl alcohol), and IPA (steam drying) in turn so as to be cleaned.

(Second Polishing Process) Then, the second polishing process was carried out as a main surface mirror polishing process. This second polishing process aims to finish the main surfaces into mirror surfaces. By the use of a double-side polishing machine and a soft resin foam polisher, mirror polishing of the main surfaces was carried out using a planetary gear mechanism. As an abrasive material, use was made of cerium oxide abrasive particles finer than the cerium oxide abrasive particles used in the first polishing process.

The glass substrates subjected to the second polishing process were immersed in respective cleaning baths of neutral detergent, neutral detergent, pure water, pure water, IPA (isopropyl alcohol), and IPA (steam drying) in turn so as to be cleaned. Ultrasonic wave was applied to each cleaning bath.

(6) Chemical Strengthening Process Subsequently, chemical strengthening was applied to the glass substrates subjected to the foregoing grinding and polishing processes. The chemical strengthening was carried out by preparing a chemical strengthening solution in the form of a mixture of potassium nitrate (60%) and sodium nitrate (40%), heating this chemical strengthening solution to 400° C., and immersing, for about three hours, the cleaned glass substrates preheated to 300° C. In order to chemically strengthen the whole surfaces of the glass substrates, the immersion was carried out in the state where the glass substrates were received in a holder so as to be retained at their end faces.

By performing the immersion process in the chemical strengthening solution as described above, lithium ions and sodium ions in the surface layer of the glass substrate are replaced by sodium ions and potassium ions in the chemical strengthening solution, respectively, so that the glass substrate is strengthened.

The thickness of a compressive stress layer formed in the surface layer of each glass substrate was about 100 to 200 µm.

The glass substrates chemically strengthened were immersed in a water bath at 20° C. so as to be quenched, and kept for about ten minutes.

The quenched glass substrates were immersed in a concentrated sulfuric acid heated to about 40° C., so as to be cleaned. Further, the glass substrates subjected to the sulfuric acid cleaning were immersed in respective cleaning baths of pure water, pure water, IPA (isopropyl alcohol), and IPA (steam drying) in turn so as to be cleaned. Ultrasonic wave was applied to each cleaning bath.

The surface roughness of the end face on the inner peripheral side of the circular hole of each substrate for the magnetic disk obtained through the foregoing processes was 0.4 µm by Rmax and 0.04 µm by Ra at the chamfered faces and 0.4 µm by Rmax and 0.05 µm by Ra at the side face portion. The surface roughness Ra at the outer peripheral end face was 0.04 µm at the chamfered faces and 0.07 µm at the side face portion. In this manner, it was confirmed that the end face on the inner peripheral side was finished into a mirror surface like the end face on the outer peripheral side.

Moreover, the surface roughness Ra of the main surface portions of each glass substrate was 0.3 nm to 0.7 nm (measured by AFM). The surfaces of the end faces were observed by an electron microscope (4000 magnifications) and it was found that the side face portions and the chamfered faces were in the mirror surface state. Further, there was observed no foreign matter or cracks on the side face portion and the chamfered faces being the end face on the inner peripheral side of the circular hole and, with respect also to the surfaces of each glass substrate, there was observed no foreign matter or particles that cause thermal asperity. Further, the flexural strength was measured by the use of a flexural strength tester (Shimadzu Autograph DDS-2000) and it was 12 to 20 kg. The flexural strength was measured in the same manner by changing the chemical strengthening level and it was about 10 to 25 kg.

EXAMPLE 2

In this example 2, magnetic disks were manufactured through the following processes.

On each of both main surfaces of each of the glass substrates for the magnetic disks obtained as described above, an Al—Ru alloy first underlayer, a Cr—Mo alloy second underlayer, a Co—Cr—Pt—B alloy magnetic layer, and a hydrogenated carbon protection layer were formed in turn by the use of a stationary opposing-type DC magnetron sputtering apparatus. Then, an alcohol-denatured perfluoropolyether lubricating layer was formed by the dip method. In this manner, the magnetic disks were obtained.

With respect to the obtained magnetic disks, it was confirmed that there was no occurrence of defect on the films such as the magnetic layers due to foreign matter. A glide test was performed and there was observed no hit (a head grazes a projection on the surface of a magnetic disk) or crash (a head collides with a projection on the surface of a magnetic disk). Further, a reproduction test was performed by the use of a magnetoresistive head and there was observed no malfunction in reproduction caused by the thermal asperity trouble.

The foregoing tests were performed according to a test method for a magnetic disk having an information recording density of 40 gigabits per $inch^2$. Specifically, the flying height of a magnetic head was set to 10 nm and the information linear recording density was set to 700 fci in the record reproduction test.

INDUSTRIAL APPLICABILITY

To provide a method which, even if a circular hole at a center portion of a disk substrate is reduced in diameter, can easily and satisfactorily polish an inner peripheral end face of the circular hole, thereby enabling providing stable-quality disk substrates at low prices and in large quantities, and to prevent the thermal asperity trouble and head crash with respect to a magnetic disk, thereby serving to increase the information recording surface density in the magnetic disk.

What is claimed is:

1. A method of manufacturing a substrate for a magnetic disk, having a step of polishing at least an end face on an inner peripheral side of a circular hole of a nonmagnetic disk substrate having the circular hole at a center portion thereof, wherein:

the end face on the inner peripheral side of the circular hole is polished by magnetic abrasive finishing in which a magnetic field is formed at least on the inner peripheral side of the circular hole, an abrasive material containing magnetic particles and abrasive particles is held in the circular hole by the magnetic field and, by moving the magnetic field with respect to the end face on the inner peripheral side of the circular hole, the abrasive material is moved with respect to the end face on the inner peripheral side of the circular hole to thereby polish the end face on the inner peripheral side of the circular hole.

2. A method of manufacturing a substrate for a magnetic disk according to claim 1, wherein:

the abrasive material in which the magnetic particles and the abrasive particles are integrated with each other is used in the magnetic abrasive finishing.

3. A method of manufacturing a substrate for a magnetic disk according to claim 1, wherein:

the magnetic particles contained in the abrasive material are ferrite-based magnetic particles.

4. A method of manufacturing a substrate for a magnetic disk according to claim 1, wherein:

the abrasive particles contained in the abrasive material are cerium oxide abrasive particles, colloidal silica abrasive particles, alumina abrasive particles, or diamond abrasive particles.

5. A method of manufacturing a substrate for a magnetic disk according to claim 1, wherein:

the abrasive material is formed into a slurry by adding a liquid so as to use the abrasive particles as free abrasive particles.

6. A method of manufacturing a substrate for a magnetic disk according to claim 1, wherein:

the magnetic abrasive finishing is performed by disposing a magnet in the circular hole and using a magnetic field formed by the magnet.

7. A method of manufacturing a substrate for a magnetic disk according to claim 1, wherein:

the magnetic abrasive finishing is performed by disposing a magnet on an outer peripheral side of the nonmagnetic disk substrate and using a magnetic field formed by the magnet.

8. A method of manufacturing a substrate for a magnetic disk according to claim 6, wherein:

a rare earth-based permanent magnet or an electromagnet is used as the magnet.

9. A method of manufacturing a substrate for a magnetic disk according to claim 1, wherein:

the nonmagnetic disk substrate is a glass disk substrate.

10. A method of manufacturing a substrate for a magnetic disk according to claim 1, wherein:

a plurality of nonmagnetic disk substrates are concentrically placed in layers and end faces on the inner peripheral side of circular holes of the nonmagnetic disk substrates are simultaneously polished.

11. A method of manufacturing a substrate for a magnetic disk according to claim 1, wherein:

a chamfered face provided at an end face portion on the inner peripheral side of the nonmagnetic disk substrate is polished by the magnetic abrasive finishing.

12. A method of manufacturing a magnetic disk, wherein:

at least a magnetic layer is formed on a main surface portion of the substrate for the magnetic disk manufactured by a method of manufacturing a substrate for a magnetic disk according to claim 1.

13. An apparatus for manufacturing a substrate for a magnetic disk, comprising:

retaining means for retaining a nonmagnetic disk substrate having a circular hole at a center portion thereof, magnetic field forming means for forming a magnetic field at least on an inner peripheral side of the circular hole of the nonmagnetic disk substrate, and magnetic field rotation means for rotating the magnetic field with respect to an end face on the inner peripheral side of the circular hole, wherein an abrasive material containing magnetic particles and abrasive particles is held in the circular hole at the center portion of the nonmagnetic disk substrate by the magnetic field formed by the magnetic field forming means and, by rotating the magnetic field with respect to the end face on the inner peripheral side of the circular hole by the magnetic field rotation means, the abrasive material is rotated with respect to the end face on the inner peripheral side of the circular hole to thereby polish the end face on the inner peripheral side of the circular hole.

14. An apparatus for manufacturing a substrate for a magnetic disk according to claim 13, wherein:

at least part of the retaining means is made of an insulating material.

* * * * *